Sept. 7, 1937.   J. G. DAVIS   2,092,550
CITRUS FRUIT CUTTING KNIFE
Filed Sept. 28, 1935
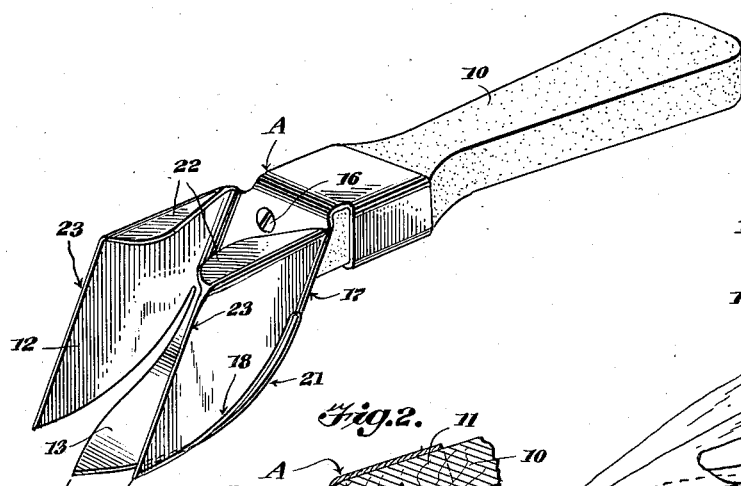
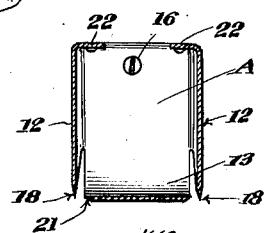
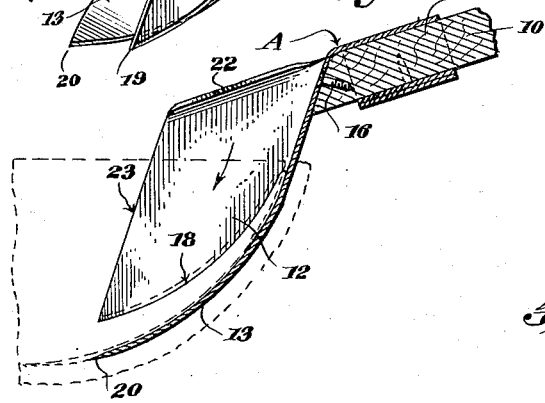
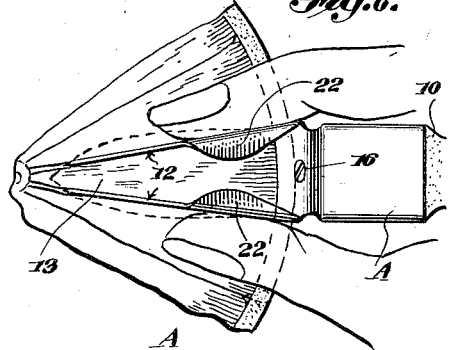
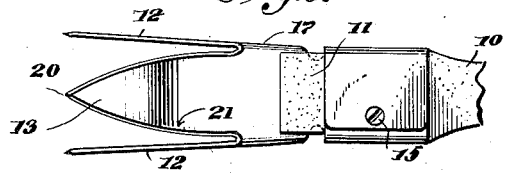
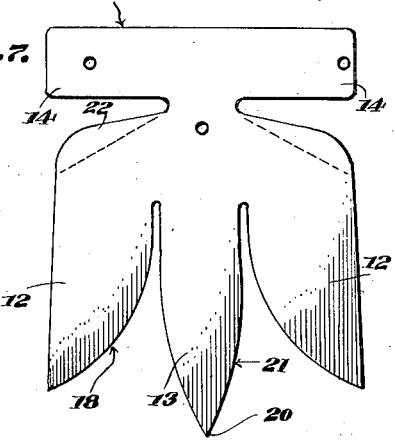
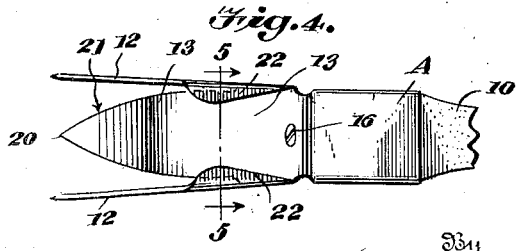
Inventor
JOHN GIFFORD DAVIS
Attorney Patented Sept. 7, 1937

2,092,550

UNITED STATES PATENT OFFICE 2,092,550

CITRUS FRUIT CUTTING KNIFE

John Gifford Davis, Pomona, Calif., assignor to Gustaves Paige Hiatt

Application September 28, 1935, Serial No. 42,691

5 Claims. (Cl. 146—3)

This invention relates to citrus fruit cutting knives, and has for one of its objects the production of a simple and efficient citrus knife which is especially designed for removing the pulp in segments from citrus fruits in a manner whereby the segments of pulp may be cut and lifted from the shell of the fruit free from the membranes which separate the segments of the fruit.

A further object of this invention is the production of a simple and efficient citrus fruit cutting knife having a plurality of blades to facilitate the cutting and removal of pulp segments from oranges, grapefruit, and other citrus fruits, by cutting the segments of pulp free from the shell and also from the separating membranes which divide the pulp segments, whereby the complete or whole segments may be removed for table or canning without the necessity of trimming the segments to remove undesirable particles of citrus membrane.

Other objects and advantages of the present invention will appear throughout the following specification and claims.

In the drawing:

Figure 1 is a perspective view of the citrus cutting knife;

Figure 2 is a longitudinal sectional view of the knife, also showing a portion of the handle;

Figure 3 is a bottom plan view of the knife, a portion of the handle being broken away;

Figure 4 is a top plan view of the citrus cutting knife, a portion of the handle being broken away;

Figure 5 is a transverse sectional view taken on line 5—5 of Figure 4;

Figure 6 is a top plan view of the citrus knife showing the manner of cutting a segment from a citrus fruit;

Figure 7 is a plan view of the blank from which the citrus knife is formed.

By referring to the drawing, it will be seen that 10 designates the handle of the citrus fruit cutting knife which may be formed of wood or other similar material preferably treated with reinforcing oil to render the handle waterproof. The handle 10 may be of any suitable or desired shape without departing from the spirit of the invention, but it is preferably provided with the shank portion 11 at one end to which shank portion 11 is secured the segment cutting portion A of the knife. This segment cutting portion A of the knife comprises a pair of substantially parallel side cutting blades 12 and a bottom forwardly curved cutting blade 13, the segment cutting portion being formed preferably from a relatively thin blank sheet of stainless spring steel having a suitable acid resisting finish. The segment cutting portion A is formed from the blank sheet as indicated in Figure 7, and is provided at one end with laterally extending ears 14 which are bent around the shank portion 11 of the handle 10, a suitable securing screw 15 being employed to secure the segment cutting portion A to the handle 10, an additional screw 16 being also employed and extending through the segment cutting portion A and engaging the end of the shank portion 11 as clearly shown in Figures 1 and 2. The side blades 12 are integrally connected to the bottom blade 13 as at 17, and each blade 12 is provided with a lower convex cutting edge 18 extending from its forward apex 19 back to the point of connection of the blade 12 with the blade 13. The blade 13 is gradually tapered toward its apex 20 and is provided with side cutting edges 21, the blade 13 being also shaped to curve slightly toward its apex, as well as tapered, and to conform to the normal contour of a fruit segment. Each blade 12 is provided with an inwardly extending overhanging flange 22 along its upper edge, the flanges 22 being bent inwardly as shown in the drawing, and providing means for facilitating the pushing of the blades down into the fruit for the purpose of extracting the segment of an orange, grapefruit or the like. These flanges will also tend to reinforce the blades 12 against unnecessary warping along their top edges and facilitate the moving of the blades into and out of proper position for the operation of the knife. The forward edges 23 of the blades 12 are slightly inclined with respect to the vertical axis of the handle to provide a forward tapering edge for each blade 12. The flanges 22 by being folded inwardly will provide an efficient means for protecting the fingers against cutting when gripped between the forefinger and thumb, and inserting the knife into the fruit. It is desired to emphasize the fact that the side blades 12 are only secured to the bottom blade 13 near their rear ends and adjacent the handle 10 at a point indicated by the numeral 17, thereby allowing the bottom blade to freely flex and the side blades also to freely flex while the knife is being inserted into the fruit for the purpose of cutting the pulp segments from the rind and membrane of the fruit.

The operation of the knife is as follows: The handle 10 is gripped in the palm of the hand of the operator and one of the side blades 12 is engaged by the thumb adjacent the flange 22 and the other side blade is engaged by the forefinger in the manner as shown in Figure 6, thereby allowing the operator through a pinching action to draw the forward ends of the side blades 12 together to conform to the tapering contour of the pulp segment of the citrus fruit. The bottom blade 13 is then inserted inside of the rind just where the fruit pulp starts, and the side blades 12 will be pinched or drawn together to conform to the tapering contour of the pulp segment and by forcing the segment cutting portion A downwardly and toward the center of the fruit, the bottom blade 13 will follow the contour of the rind cutting the soft pulp from the rind and membrane thereof and the bottom edges 18 will cut the pulp segments from the membrane walls which divide the segments of the fruit, this action being accomplished by pushing the knife straight down. Because of the fact that the blade curves slightly forwardly, the blade 13 will follow the rind curve or the contour of the fruit and the side blades 12 will be forced forwardly or toward the center of the fruit toward the core, in this manner cutting the fruit pulp from the membranes. The three blades meet at the bottom or along their cutting edges, and cut the fruit pulp from the rind toward the center. If it is desired to withdraw or lift the segment from the rind after the segment has been cut, and after the blades have been forced up to the core of the fruit, the knife is withdrawn to a distance of approximately a one-fourth incline from the core and by rocking the knife including the bottom blade 13 back over the rind, the complete segment may be easily lifted out in its proper contour and without distortion of its shape and without breaking the pulp apart. The segment may then be lifted out, resting upon the bottom blade and between the side blades where the segment may be deposited in a bowl or other suitable container.

If, on the other hand, it is desired to retain the segment in the rind after it has been cut and loosened in the manner above described, the knife may be merely withdrawn and the segments may remain in the shell or rind of the fruit for serving without distortion and without greatly altering the appearance of the rind and pulp content of the fruit. The slight tension of the two side blades will completely loosen the fruit pulp from the core and from the membranes, since the blades may be pinched together at their apex for this purpose, if desired. It should be understood that the side blades 12 by being secured only at their inner ends and being free to flex at their forward ends may be adjusted to fit different sized segments, such for instance as the segments of an orange, or the usually larger segments of a grapefruit. Because of the fact that the bottom blade is curved as illustrated, the bottom blade is first inserted near the wide end of the segment adjacent the rind by holding the pointed end of the bottom blade substantially vertically and then by rocking the handle, as previously described, the bottom blade will follow the contour of the rind, and in this way completely cut the pulp fruit from the bottom or inner face of the rind, the side blades 12 cutting the pulp fruit from the membrane walls of the segments. The forward pointed ends of the flexible side blades 12 will allow the pulp segments to be readily disengaged from the central core.

The present invention provides a specially designed citrus fruit cutting knife which permits the cutting of the fruit pulp segments from the shell of the fruit without the necessity of touching the segment with the hands of the operator. This knife also permits the fruit to remain in its decorative contour since the segments may be lifted out in their normal form without distortion or breaking apart, or they may be left to remain within the rind cup for serving, only one cutting operation being necessary to separate the pulp from the rind cup and membranes.

The present invention also provides an adjustable knife or cutting element which will permit the use of the knife or cutting element in various sized fruit allowing the segments to be cut with great speed and besides being sanitary because it is unnecessary for the hands to touch the segment and all of the edible portions of the segments may be cut from the shell or cup of the fruit and at the same time eliminate the tough membranes.

Having described the invention, what I claim as new is:—

1. A citrus cutting knife comprising a pair of spaced vertically disposed flexible side blades having their lower edges similarly curved, a bottom cutting blade disposed intermediate the side blades and at substantially right angles thereto, said bottom blade being joined to rear portions of the side blades and extending forwardly along the curved lower edges of the side blades, the side blades and the bottom blade being flexible and tapering towards the front and cooperating with each other to form a spoon-shaped device, and a handle attached to the rear portions.

2. A citrus fruit cutting knife comprising a handle-engaging portion, and a spoon-shaped body consisting of a plurality of spaced side blades, an intermediate blade extending downwardly from the hand-engaging portion between the side blades in a plane at substantially right angles thereto and curved forwardly and having its front end terminating adjacent the front ends of the side blades, the side blades and the intermediate blade having their upper end portions integrally united and for the remainder of their lengths being free from each other whereby the blades may be flexed out of their normal relation to each other and accommodate themselves to the contour of a section of fruit to be removed, and upper ends of the side blades being provided with inwardly extending flanges constituting finger-engaging members and serving to place the blades.

3. A citrus fruit cutting knife comprising a handle, a shank engaging the front end of said handle, and a spoon-shaped body consisting of a cutting blade extending downwardly from said shank and curved forwardly, and a pair of vertically disposed side blades extending at substantially right angles to the first blade, all of said blades being flexible, the side blades having rear portions of their upper ends united to opposite side edges of the upper end portion of the first blade and for the remainder of their lengths being free from the first blade, the first blade being tapered forwardly and having sharpened side edges intersecting at its front end, and the side blades having vertical front edges and curved rear edges conforming to the curvature of the first blade and intersecting the lower ends of their front edges.

4. In a citrus fruit cutting knife, a spoon-shaped structure comprising a handle-engaging shank, and a spoon shaped body consisting of a bottom blade extending downwardly therefrom and curved forwardly and having curved side edges intersecting at its front end to provide a tapered blade, a pair of flexible side blades disposed vertically at opposite sides of the bottom blade and having their upper ends integrally united to the upper end portion of the bottom blade adjacent the handle-engaging shank, said side blades having vertical front edges and curved rear edges intersecting lower ends of their front edges and spaced from edges of the rear blade whereby the side blades and the bottom blade may be flexed relative to each other to accommodate the blades to different sized segments of fruit to be cut, the bottom blade having its front end in the vertical plane of lower ends of the side blades and being adapted to cut pulp from the inner face of the shell of a citrus fruit and the side blades being adapted to cut the pulp segment from the segment walls of a citrus fruit.

5. A citrus fruit cutting knife comprising a handle-engaging shank, and a spoon-shaped body consisting of a bottom blade formed integral with said shank and extending downwardly therefrom and curved forwardly and tapered to a point at its front end, a pair of flexible side blades disposed in planes at right angles to the bottom blade and integrally secured at their upper ends to opposite side edges of the upper end portion of the bottom blade adjacent said shank, the side blades being tapered to points at their lower ends, the bottom blade being free from the side blades for substantially its entire length and having its front end terminating in close proximity to the plane of the pointed ends of the side blades, and upper end portions of the side blades being bent to form inwardly extending flanges constituting finger holds and reinforcements for upper ends of the side blades.

JOHN GIFFORD DAVIS.